3,453,091
PROCESS FOR DISINTEGRATING
GRAPHITE BODIES
Karl Knotik, Siegendorf, and Peter Leichter and Harald Wagner, Vienna, Austria, assignors to Osterreichische Studiengesellschaft fur Atomenergie, Vienna, Austria
No Drawing. Filed Apr. 11, 1967, Ser. No. 629,891
Claims priority, application Austria, Apr. 12, 1966,
A 3,477
Int. Cl. G21c 19/00; C22b 59/00, 61/04
U.S. Cl. 23—324                                    7 Claims

ABSTRACT OF THE DISCLOSURE

This invention is concerned with the recovery of nuclear fuel particles from graphite bodies in which the particles are embedded. According to the inventive process, the graphite bodies are subjected to the action of oxidizing acids or their salts, whereby the graphite bodies are disintegrated into graphite powder and fuel particles. The graphite powder and the fuel particles are then separated from each other. A number of oxidizing acids such as peroxy acids, fuming nitric acid and the like are specifically disclosed.

SUMMARY OF THE INVENTION

The invention generally relates to nuclear fuel recovery and is particularly directed to a method of separating nuclear fuel particles from graphite bodies in which the nuclear fuel particles are embedded.

Considered from another aspect, the invention is concerned with a method of disintegrating or converting compacted graphite into powder form.

Nuclear fuel used in high temperature nuclear reactors is oftentimes fed to the reactors in the form of spherical fuel particles which are coated with pyrocarbon and which are embedded in graphite. The structure thus formed is compressed or compacted into pellets or bodies which generally are referred to as "fuel inserts." It is customary to recover the nuclear fuel after it has been partially spent in the reactor by stripping the matrix and coating material. For this purpose the nuclear fuel particles have to be separated from the graphite in which they are embedded. Since the fuel inserts of the kind described contain a large amount of graphite which sometimes may be more than 90% of the total mass, it is of course desired that the graphite be separated from the fuel particles before the actual chemical recovery processing of the fuel particles takes place, as otherwise considerable amounts of graphite would contaminate the chemical recovery process and thus render it more difficult and cumbersome.

In the past considerable difficulties have been encountered in effectively and easily separating the graphite from the fuel particles.

Accordingly it is a primary object of this invention to provide for a method according to which the graphite and the fuel particles can be readily separated from each other.

Generally it is an object of this invention to improve on the art of nuclear fuel recovery processing as presently practiced.

Briefly, and in accordance with this invention, the compacted graphite bodies or pellets are subjected to the action of oxidizing acids or salts of such acids. Mixtures of such acids or salts are also suitable. When the graphite bodies are thus immersed in the oxidizing medium, the compacted bodies disintegrate and the graphite is obtained in the form of a powder, while the nuclear fuel particles are not attacked by the oxidizing medium. The graphite powder can then easily be separated from the nuclear fuel particles in any manner known per se. Thus, for example, it is possible to form a slurry in which the separation of the graphite powder from the fuel particles takes place by gravity.

A large number of oxidizing acids and their salts have proved to be suitable for the inventive purpose. It has thus been found that concentrated or fuming nitric acid, peroxydisulfuric acid, peroxymonosulfuric acid and salts of these acids yield excellent results. Tests have demonstrated that the inventive method is particularly advantageously carried out if the oxidizing substances are dissolved in or mixed with concentrated sulfuric acid. Further, a mixture of hydrogen peroxide and concentrated sulfuric acid constitutes an excellent oxidizing medium for the inventive purpose. It is also within the scope of this invention to use an oxidizing medium which is obtained by electrolytic anodic oxidation of sulfuric acid. An oxidizing medium obtained in the last-mentioned manner is particularly suitable if a continuous method for separating graphite from nuclear fuel particles is desired.

Very satisfactory results have also been obtained with mixtures of concentrated sulfuric acid and the ammonium salt of peroxydisulfuric acid, the mixture being enriched with concentrated nitric acid. If a compacted graphite body is immersed in a 20% solution of ammonium peroxydisulfate in concentrated sulfuric acid, a very pronounced swelling of the body and separation of graphite powder from the body can be observed already after a few minutes.

Example I

A nuclear fuel containing graphite body of a diameter of 13 mm. was inserted into a 20% solution of ammonium peroxydisulfate in concentrated sulfuric acid. The test was carried out at room temperature. The body disintegrated in the solution within 30 to 40 minutes into fine graphite powder and fuel particles. The fuel particles recovered after separation of the graphite powder were substantially unaffected by the treatment in the acid.

Example II

The experiment of Example I was repeated with a fuel insert of 25 mm. diameter. The temperature of the oxidizing medium was 40° C. Complete disintegration into graphite powder and fuel particles was effected within 40 minutes.

Tests have indicated that mixtures of concentrated or fuming nitric acid and concentrated sulfuric acid cause the disintegration of the graphite bodies generally more rapidly than peroxydisulfuric acid and its salts. If the method is carried out with hydrogen peroxide in concentrated sulfuric acid, then the disintegration is less pronounced than if nitric acid, peroxydisulfuric acid or their salts in concentrated sulfuric acid are used.

If, for example, a 20% solution of ammonium peroxydisulfate in concentrated sulfuric acid contains 1% of water, then the time necessary for disintegrating the graphite body increases by about 80%.

The consumption of oxidizing substance increases significantly with increasing disintegration of the graphite body. For this reason, it is recommended that the graphite powder obtained during the procedure is removed from the liquid oxidizing medium as rapidly as possible.

Solutions of salts of peroxydisulfuric acid in concentrated sulfuric acid are relatively stable up to temperatures of about 60° C. Above 80° C., a significant increase in the decomposition speed can be observed. Solutions of peroxydisulfuric acid in concentrated sulfuric acid or pure peroxydisulfuric acid have considerably less stability. They have, however, the advantage that no contaminating or disturbing salts are formed if the method is carried out continuously.

While a specific embodiment of the invention has been shown and described in detail to illustrate the application of the inventive principles, it will be understood that the invention may be embodied otherwise without departing from such principles.

What is claimed is:

1. In a process of separating coated nuclear fuel particles from graphite bodies in which the fuel particles are embedded, the step of immersing the graphite bodies in a liquid oxidizing medium selected from the group consisting of peroxydisulfuric acid, peroxymonosulfuric acid, and their ammonium and alkali metal salts and thereby disintegrating the graphite bodies into powder form without affecting the nuclear fuel particles.

2. In the process as set forth in claim 1 after disintegrating the graphite bodies into powder form the step of separating the graphite powder from the nuclear fuel particles.

3. In the process as set forth in claim 2, comprising the step of forming a slurry, and separating the graphite powder and the nuclear fuel particles by means of gravity.

4. In a process as set forth in claim 2, comprising the step of continuously removing the graphite powder from the nuclear fuel particle.

5. In a process as set forth in claim 1, wherein the liquid oxidizing medium is combined with concentrated sulfuric acid for disintegrating the graphite bodies into powder form.

6. In a process as set forth in claim 5, wherein a 20 percent solution of ammonium peroxydisulfate is mixed with concentrated sulfuric acid for disintegrating the graphite bodies.

7. In a process of separating nuclear fuel particles from graphite bodies in which the fuel particles are embedded, the step of immersing the graphite bodies in a liquid medium consisting of hydrogen peroxide and concentrated sulphuric acid for disintegrating the graphite bodies into powder form, and separating the graphite powder and the nuclear fuel particles.

References Cited

S. Lawroski et al.: Preparation For Fuel Processing, January 1961, Reactor Fuel Processing, vol. 4, #1, p. 17.

S. Lawroski et al.: Preparation For Fuel Processing, July 1961, Reactor Fuel Processing, vol. 4, #3, p. 14.

S. Lawroski et al.: Research and Development on Aqueous Processing, July 1962, Reactor Fuel Processing vol. 5, #3, pp. 9–10.

CARL D. QUARFORTH, *Primary Examiner.*

M. J. McGREAL, *Assistant Examiner.*

U.S. Cl. X.R.

176—89